Patented Oct. 10, 1950

2,525,073

UNITED STATES PATENT OFFICE 2,525,073

MAGNESIA-CERIA AND MAGNESIA-BERYLLIA CATALYSTS

Charles N. Kimberlin, Jr., Baton Rouge, La., assignor to Standard Oil Development Company, a corporation of Delaware No Drawing. Application March 22, 1950,
Serial No. 151,307

3 Claims. (Cl. 252—475)

The present invention is concerned with a process for the manufacture of improved inorganic gels and/or catalysts. The invention is more particularly concerned with an improved process for the production of true inorganic hydrogels as compared to gelatinous precipitates. In accordance with this invention non-siliceous, true hydrogels of inorganic oxides are produced by treating a metallic salt solution with magnesia.

It is well known in the art to improve the quality of oils, particularly petroleum oils, by treating the same with catalysts under various operating conditions. For example, it is known to contact high-boiling petroleum oils with a catalyst containing silica at temperatures in the range from about 600° F. to about 1100° F. in order to crack the oil and to secure petroleum oil fractions boiling in the motor fuel boiling range. Oxides of other metals, as for example, magnesium, zirconium, beryllium and aluminum are employed in conjunction with the silica. A particularly desirable catalyst suitable for treating petroleum oils boiling in the gas-oil boiling range in order to produce lower boiling fractions comprises a silica-alumina catalyst.

The present process is particularly directed toward the preparation of true non-siliceous hydrogels, as compared to gelatinous precipitates of inorganic oxides. True hydrogels may be defined as precipitates which occupy the entire volume of the solution from which they are formed, and possess a definitely rigid structure and when fractured will show a conchoidal fracture as compared to an irregular and ragged edge fracture. On the other hand, gelatinous precipitates occupy only a part of the volume of the solution from which they are formed and have no rigidity of structure and do not show conchoidal fracture. Both hydrogels and gelatinous precipitates can usually be dried to solids which have a gel structure. However, for many purposes, such as adsorptive agents or catalysts or catalytic carriers, the true hydrogels show distinct advantages since the dried gel prepared from the true hydrogels usually possesses a more open and porous structure as compared to the gels produced from gelatinous precipitates. Furthermore, the hydrogels can be more easily washed free of soluble impurities due to the tendency of the gelatinous precipitates to peptize upon washing. A distinct and further advantage of hydrogels is that due to the rigid structure they can be formed into high quality spheres.

As stated heretofore, according to the present invention true hydrogels of inorganic oxides may be readily prepared by treating a metallic salt solution such as cerium salt or beryllium salt solution with magnesia.

The method of preparation is to start with a water soluble salt of the metals cerium or beryllium. The salts generally comprise the chlorides and the nitrates, although other soluble salts could be used, and satisfactory salts are, for example, cerous nitrate (Ce(NO$_3$)$_3$.6H$_2$O), cerous bromide (CeBr$_3$.H$_2$O), cerous chloride (CeCl$_3$), beryllium nitrate (Be(NO$_3$)$_2$.3H$_2$O), beryllium chloride (BeCl$_2$), etc.

The water soluble salt of the selected metal is dissolved in water. It is preferred that the salt solution be relatively concentrated and preferably that the concentration be at least 80% of the saturation value. A water slurry of magnesia is then prepared and the magnesia slurry is mixed with the salt solution. In general it is preferred that the concentration of the salt solution should be such that after the addition of the magnesia slurry the concentration of the metal oxide will be at least 50 grams per liter of the total volume. If too low a concentration to produce a hydrogel is employed, there results a hydrosol of the hydrous oxide which can be freed of soluble magnesium salts by dialysis.

The following reactions serve to illustrate this invention:

$$2CeCl_3 + 3MgO = Ce_2O_3 + 3MgCl_2$$

$$Be(NO_3)_2 + MgO = BeO + Mg(NO_3)_2$$

The hydrogels formed in accordance with this process may be washed free of soluble magnesium salts either before or after drying. Also, although it is preferred to employ a water slurry of magnesia, dry magnesia powder may be introduced per se into the salt solution. The magnesia can be used either in stoichiometrical quantity or in larger quantities provided free magnesia in the final product is not objectionable. On the other hand, if excess magnesia has been used, the excess can subsequently be removed by treating the hydrogel or the dried gel with ammonium chloride or other weakly acidic solutions.

The time required for the hydrogel to form depends upon various factors. The time of set will be dependent on operating conditions, such as the nature of the salt used as a starting material, the concentration of the salt employed, the temperature of the set (high temperature favoring more rapid setting), and the quantity of magnesia employed. The time of setting will also vary, depending upon the type of magnesia used. The following tabulation lists the results of operations in which 100 ccs. of a cerium nitrate solution containing 10 g. $Ce_2O_3$ was treated at room temperatures with a slurry of 5 grams of 200 mesh magnesia in 20 ccs. of water.

| Type of Magnesia | Set Time, Seconds |
|---|---|
| A | 600 |
| B | about 20 |

The foregoing magnesias differ in the temperature at which they were calcined, the higher temperature of calcination resulting in the longer set time. They are commercial magnesias produced by precipitating magnesia from sea water, washing and burning the precipitate. Magnesia A was produced by calcining for 5 to 6 hours at 1470° to 1650° F.; magnesia B was produced by calcining for about 4 hours at 570° to 750° F.

The preferred temperature in the treatment of the salt solution with magnesia is in the range from about 50° F. to 200° F. A particularly desirable process for rapidly producing hydrogels is to treat the salt solution with magnesia at a temperature in the range from about 125° F., to 200° F., particularly at about 150° F.

Although it is not desired to limit this invention by any theory of the mechanism of the reaction, it is believed that the mechanism of hydrogel formation when magnesia is added to a salt solution is as follows:

Magnesia when added to an acid solution, due to its low rate of solubility, gradually raises the pH throughout the solution without localized regions of high pH such as are unavoidable when using more soluble bases. This condition is ideal for the formation of true hydrogels. On the other hand, the localized regions of high pH obtained when treating a salt solution with a more soluble base are favorable to the formation of gelatinous precipitates. Magnesia is the preferred reagent, but other similar difficultly soluble bases may be used.

As pointed out above, this invention is particularly adapted for the preparation of high quality sphere hydrogels.

In order to further illustrate this invention, the following examples are given:

*Example I*

A solution of cerous nitrate was prepared by dissolving 26.5 grams of $Ce(NO_3)_3.6H_2O$ in water to give 100 cc. of solution. A slurry of 5 grams of type BMgO in 20 cc. of water was added with stirring to 100 cc. of the $Ce(NO_3)_3$ solution while the mixture is at room temperature. The mixture was stirred for about 10 minutes at which time it set to a firm hydrogel. The hydrogel was partially dried to remove about 50% of its water content. It was then washed with distilled water to remove magnesium nitrate, after which it was completely dried at about 300° F. to a cerium oxide gel of high quality. The finished gel still contained some magnesia since the magnesia was used in excess of the stoichiometric requirements. It is useful as an adsorbent and as a catalytic material.

*Example II*

A solution of beryllium nitrate was prepared by dissolving 60 grams of $Be(NO_3)_2.3H_2O$ in sufficient water to give 100 cc. of solution. A slurry of 14 grams of MgO in 25 cc. of water was added with stirring to the beryllium nitrate solution at room temperature. After about 10 minutes the mixture set to a firm hydrogel. The hydrogel was aged for 24 hours at room temperature and then partially dried in a steam heated oven to remove about 50% of its water content after which it was washed with distilled water to remove magnesium nitrate. It was then finally dried at about 300° F. to give a high quality beryllium oxide gel which still contained a small amount of unreacted magnesia. This gel is useful as an adsorbent.

*Example III*

A solution of mixed aluminum and beryllium nitrates was prepared by dissolving 50 grams of $Al(NO_3)_3.9H_2O$ and 5.6 grams of $Be(NO_3)_2.3H_2O$ in sufficient water to make 100 cc. of solution. To this solution was added a slurry of 9 grams of magnesia in 20 cc. of water with stirring. After about 8 minutes the mixture set to a firm hydrogel. The hydrogel was aged overnight and then washed with distilled water to remove magnesium nitrate. The washed hydrogel was dried at about 300° F. to give a composite gel of 90% alumina–10% beryllia with only a trace of magnesia. This gel is useful as a catalyst for cracking gas oils to gasoline.

This case forms a continuation in part of application Serial No. 707,535, filed by Charles N. Kimberlin, Jr. for "Improved Catalyst" on November 2, 1946.

What is claimed is:

1. An improved process for the preparation of true hydrogels which consists essentially in preparing an aqueous solution of a soluble salt of a metal selected from the group consisting of cerium and beryllium in amount sufficient to produce a concentration in the product of at least 50 g. of metal oxide per liter and adding to said solution at least a stoichiometrically equivalent amount of magnesia to form a true hydrogel of the said metal.

2. The process defined by claim 1 wherein the soluble salt of the metal selected is a cerium salt.

3. The process defined by claim 1 wherein the soluble salt of the metal selected is a beryllium salt.

CHARLES N. KIMBERLIN, Jr.

No references cited.